United States Patent
Roger et al.

(10) Patent No.: US 11,435,763 B2
(45) Date of Patent: Sep. 6, 2022

(54) ELECTRONIC DEVICE, AND METHOD, FOR AUTOMATICALLY DETERMINING PILOTING INFORMATION OF A MOBILE MACHINE ACCOMPANYING A LEADER MOBILE MACHINE, ASSOCIATED COMPUTER PROGRAM

(71) Applicant: THALES, Courbevoie (FR)

(72) Inventors: Michel Roger, Toulouse (FR); Adrien De Jaureguiberry, Toulouse (FR); Guy Deker, Toulouse (FR)

(73) Assignee: THALES, Courbevoie (FR)

( * ) Notice: Subject to any disclaimer, the term of this patent is extended or adjusted under 35 U.S.C. 154(b) by 294 days.

(21) Appl. No.: 16/700,790

(22) Filed: Dec. 2, 2019

(65) Prior Publication Data
US 2020/0174502 A1 Jun. 4, 2020

(30) Foreign Application Priority Data
Dec. 4, 2018 (FR) ...................................... 18 72282

(51) Int. Cl.
*G05D 1/10* (2006.01)
*B64C 39/02* (2006.01)

(52) U.S. Cl.
CPC ........... *G05D 1/104* (2013.01); *B64C 39/024* (2013.01); *B64C 2201/143* (2013.01)

(58) Field of Classification Search
CPC ........ B64C 2201/143; B64C 2201/021; B64C 39/024; G05D 1/104
See application file for complete search history.

(56) References Cited

U.S. PATENT DOCUMENTS

| 2005/0165516 A1* | 7/2005 | Haissig | ................ | G08G 5/0008 |
| | | | | 701/4 |
| 2008/0039986 A1* | 2/2008 | Winkler | ................ | G05D 1/104 |
| | | | | 701/4 |

(Continued)

FOREIGN PATENT DOCUMENTS

CN 104216382 A * 12/2014

OTHER PUBLICATIONS

Machine Translation: CN 104216382 A (year:2014).*

(Continued)

*Primary Examiner* — Anne Marie Antonucci
*Assistant Examiner* — Connor L Knight
(74) *Attorney, Agent, or Firm* — ArentFox Schiff LLP

(57) ABSTRACT

Automatic flight information determination device for automatically determining flight control information for an accompanying mobile machine accompanying a leader mobile machine, said device being adapted for collecting the location data of the leader mobile machine from among the actual location data derived from measurements relating to the current location of the leader mobile machine and the current trajectory data of the accompanying mobile machine, and of determining, on the basis of said location data collected, the information items for piloting the accompanying mobile machine as a function of a set of at least two values to be adhered to with respect to the location defined by the data collected, said values to be adhered to being representative of the values included among: a minimum vertical/flight level separation value, a minimum longitudinal/along track separation value, and a minimum lateral/between tracks separation value.

7 Claims, 6 Drawing Sheets

(56) References Cited

U.S. PATENT DOCUMENTS

| | | | | |
|---|---|---|---|---|
| 2010/0168937 A1* | 7/2010 | Soijer | ................... | G08G 5/0052 |
| | | | | 701/11 |
| 2017/0131726 A1* | 5/2017 | Speyer | ................... | G05D 1/104 |
| 2018/0348796 A1* | 12/2018 | Torralba | ............... | G05D 1/0825 |
| 2019/0041876 A1* | 2/2019 | Robin | .................... | G08G 5/045 |

OTHER PUBLICATIONS

French Search Report, from the French Patent Office in counterpart French Application No. 1872282, dated Sep. 26, 2019.

Shin, J. et al., "Formation flight control under communication failure", Robot Communication and Coordination, IEEE Press, 445 Hoes Lane, PO Box 1331, Piscataway, NJ 08855-1331 USA, pp. 1-4, (2007).

Waydo, S. et al., "UAV as a Reliable Wingman: A Flight Demonstration", IEEE Transactions on Control Systems Technology, IEEE Service Center, vol. 15, No. 4, pp. 680-688 (Jul. 2007).

\* cited by examiner

ELECTRONICAL DEVICE, AND METHOD, FOR AUTOMATICALLY DETERMINING PILOTING INFORMATION OF A MOBILE MACHINE ACCOMPANYING A LEADER MOBILE MACHINE, ASSOCIATED COMPUTER PROGRAM

CROSS-REFERENCE TO RELATED APPLICATIONS

This application claims priority to French Patent Application No. 18 72282, filed on Dec. 4, 2018. The disclosure of the priority application is incorporated in its entirety herein by reference.

TECHNICAL FIELD OF THE INVENTION

The present invention relates to the field of guidance of mobile machines (vehicles) moving in formation.

In the domain of formation flying, for example, pilots currently have to define a flight "leader/lead" aircraft that will serve as a guide for the other aircraft following it which may sometimes be referred to as "wing" or "accompanying" aircraft. The pilots of these accompanying aircraft fly or pilot by sight (visual flying) so as to ensure that they are following behind their leader. Historically, formation flights are carried out in compliance with rules that specify the responsibilities of all the actors involved. Thus, typically the leader must maintain a constant speed by not improperly applying the gas throttle or thrust lever, keeping away from extreme speed/power settings in order to always leave sufficient margin room for the accompanying aircraft to accelerate or decelerate, perform the transitions in a progressive manner while providing for maximum anticipation, transmit the top of descent/top of climb, the speed indications, altitudes and courses/headings in a timely manner. And the pilot of an accompanying wing aircraft must ensure safety by always keeping an eye on the leader and the other accompanying aircraft in their field of vision and maintaining a position that would allow for disengagement if necessary.

The spacing between the mobile machines (vehicles) moving in formation, typically the aircraft flying in a formation flight, is the parameter which determines the dimensions of the type of mission to be carried out.

In a formation flight, the spacing is thus defined, along each characteristic plane as follows:
- vertical separation (between flight levels) represents the spacing distance between the horizontal planes of the leader aircraft and wing aircraft and is controlled with the elevator control;
- longitudinal separation (along track) is the longitudinal spacing distance between the airplanes and is controlled by means of the gas throttle;
- lateral separation (between tracks) is the lateral or sidewise spacing distance between the airplanes and is controlled by means of the ailerons or the rudder.

BACKGROUND OF THE INVENTION

At present maintaining these spacings is effected manually and for example in the following order: vertical/flight level separation, longitudinal/along track separation, lateral/between tracks separation.

Whereas formation flight exists between/among (manned) aircraft, such is not the case for the configuration wherein a leader airplane is accompanied by a pilotless (unmanned) aircraft. There is no existing solution because an accompanying unmanned aircraft with no pilot is not in a position to execute the visually guided operation of tracking and following its leader. Even if this accompanying aircraft were in fact to have a pilot on the ground, formation flying requires a responsiveness and reactivity that the very latency of communication between the ground and on board the aircraft could turn into a major impediment. However, it could be useful for an unmanned accompanying mobile vehicle to be able to fly in formation, in a manner so as to provide assistance to the mission of protecting its lead mobile vehicle.

SUMMARY OF THE INVENTION

To this end, according to a first aspect, the invention provides a flight information determination device for determining flight control information for piloting a accompanying mobile machine following a leader mobile machine, these information items being flight control indications for piloting the accompanying mobile machine and/or deviations in position between a current position of said leader mobile machine and a current position of said accompanying mobile machine, wherein it is adapted for collecting the data pertaining to location of the leader mobile machine from the data pertaining to the actual location derived from measurements relating to the current location of the leader mobile machine and the data pertaining to the target trajectory of the leader mobile machine, and moreover of determining, on the basis of said location data collected, the flight control information and data for piloting the accompanying mobile machine as a function of a set of at least two values to be adhered to with respect to the location defined by the data collected, said values to be adhered to being representative of the values included among: a minimum vertical/flight level separation value, a minimum longitudinal/along track separation value, a minimum lateral/between tracks separation value.

The present invention provides a solution that enables the guiding of mobile vehicles moving in formation, including, but not exclusively, an unmanned accompanying mobile machine. This solution is based on automating of the process of accompanying, thereby enabling the accompanying mobile machine to become autonomous so as to follow its leader.

In the relevant embodiments, the electronic flight information determination device for determining piloting information items according to the invention includes in addition one or more of the following characteristic features:
- this device, when determining piloting information items, is adapted for selecting a calculation method from among different calculation methods for calculating, on the basis of, among the most recently collected data, the presence or absence of data relating to a target trajectory of the leader mobile machine and the presence or absence of data pertaining to actual location derived from measurements relating to the current location of the leader mobile machine;
- it is adapted for determining, in relation to each of at least two dimensions among the longitudinal, vertical and lateral dimensions associated with the said at least two values to be adhered to, the piloting information items, by selecting for each independently, from among different calculation methods, the calculation method for calculating the information in relation to the said dimension, based on the presence or absence, for the said dimension, of the said data pertaining to the actual location derived from measurements relating to the current location of the leader mobile machine and/or the said data relating to the target trajectory of the leader mobile machine;

it is adapted for selecting a formation flight mode from among a plurality of formation flight modes each associated with a different set of values to be adhered to, the said device being adapted for modifying, based on the said data collected pertaining to the actual location and/or target trajectory, the said formation flight mode, on the basis of:

in the most recent data collected, the presence or absence of data extracted from a target trajectory and the presence or absence of data pertaining to the actual location derived from measurements relating to the current location of the leader mobile machine; and/or the comparison between the accuracy of the data pertaining to the actual location derived from measurements relating to the current location of the leader mobile machine and the minimum separation values from the set of all minimum separation values;

it is adapted for comparing, among the data collected, the data pertaining to the actual location derived from measurements relating to the current location of the leader mobile machine and the data relating to the target trajectory of the leader mobile machine, detecting a situation of the trajectory not being followed in case of deviation greater than a pre-determined threshold;

wherein the said values to be adhered to are values from among a time derivative of a minimum vertical/flight level separation value, a time derivative of a minimum longitudinal/along track separation value, and a time derivative of a minimum lateral/between tracks separation value.

According to a second aspect, the present invention provides a wing/accompanying mobile machine accompanying a leader mobile machine, that includes an electronic flight information determination device for determining flight control information according to the first aspect of the invention, and an automatic, semi-automatic or assisted piloting module, which is adapted for automatically piloting the said vehicle based on the said information items.

According to a third aspect, the present invention provides a flight information determination method for determining flight control information for an accompanying mobile machine of a leader mobile machine, these information items being piloting indications for the accompanying mobile machine and/or deviations in position between a current position of said leader mobile machine and a current position of said accompanying mobile machine, said method comprising the steps operationally executed by an electronic information processing module and consisting in:

collecting the data pertaining to location of the leader mobile vehicle from among data pertaining to the actual location derived from measurements relating to the current location of the leader mobile machine and data pertaining to the target trajectory of the leader mobile machine; and determining, based on said location data collected, the piloting information items for the accompanying mobile machine as a function of a set of at least two values to be adhered to with respect to the location defined by the data collected, said values to be adhered to being representative of the values included among: a minimum vertical/flight level separation value, a minimum longitudinal/along track separation value, a minimum lateral/between tracks separation value.

In the relevant embodiments, the flight information determination method for automatically determining flight control information for piloting a wing mobile machine accompanying a leader mobile machine according to the invention in addition includes one or more of the following characteristic features:

it comprises a selection step, during the determination of the piloting information items, for selecting a calculation method from among different calculation methods for calculating, on the basis of, among the most recently collected data, the presence or absence of data relating to a target trajectory of the leader mobile machine and the presence or absence of data pertaining to actual location derived from measurements relating to the current location of the leader mobile machine;

it comprises a piloting information determination step for determining, in relation to each of at least two dimensions among the longitudinal, vertical and lateral dimensions associated with the said at least two values to be adhered to, the piloting information items, by selecting for each independently, from among different calculation methods, the calculation method for calculating the information in relation to the said dimension, based on the presence or absence, for the said dimension, of the said data pertaining to the actual location derived from measurements relating to the current location of the leader mobile machine and/or the said data relating to the target trajectory of the leader mobile machine.

According to a fourth aspect, the present invention provides a computer program comprising of software instructions which, when executed by a computer, operationally implement a method as defined here above.

BRIEF DESCRIPTION OF THE DRAWINGS

These features and advantages of the invention will become apparent upon reading the description which follows, given solely by way of example, and with reference made to the appended drawings, in which.

DETAILED DESCRIPTION

Figure 1:
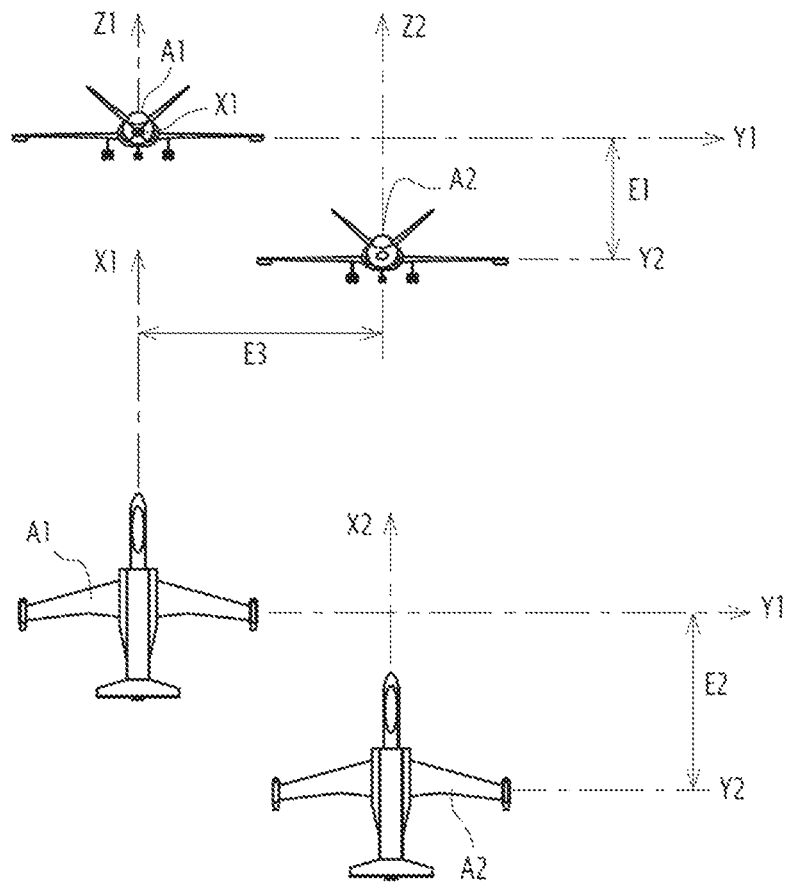
FIG. 1 represents a view illustrating the spacing parameters in one embodiment of the invention applied to the formation flight.

FIG. 1 represents, in one embodiment of the invention, the leader aircraft A1 and wing aircraft A2 in a formation flight, and the axes $X_i$, $Y_i$, $Z_i$, respectively longitudinal, lateral and vertical axes of the aircraft $A_i$, $i=1, 2$: the upper part of FIG. 1 is a rear view in relation to the vertical plane $Y_iZ_i$ while the lower part is a view from above of the horizontal plane $X_i$, $Y_i$ of the aircraft.

The spacing is represented by the vertical/flight level separation E1, the longitudinal/along track separation E2 and the lateral/between tracks separation E3.

In the embodiment considered, the leader aircraft A1 is a manned airplane with pilot and the accompanying aircraft A2 is for example, an unmanned aircraft with no pilot.

In the embodiment considered, they are each equipped with a system for managing the flight, that is to say "Flight Management System" or FMS, and an automatic pilot (not shown). The accompanying aircraft A2 in addition includes an electronic flight information determination device for automatically determining flight control indications 1, which in one embodiment is integrated within the FMS.

The automatic flight control indications determination device 1 is adapted for collecting the data pertaining to location of the leader aircraft A1 and of determining, in particular based on the location data collected, the piloting indications for piloting the accompanying aircraft A2 as a function of the pre-determined minimum values (minima) of vertical/flight level separation, longitudinal/along track separation, and lateral/between tracks separation that are to be adhered to.

The FMS, for example, is provided with the following functions described in the standard ARINC [Aeronautical Radio, Incorporated] 702 (Advanced Flight Management Computer System, December 1996):

Navigation (LOCNAV), in order to effect the optimal location of the aircraft based on the geolocation means (GPS, satellite based geo-positioning or GPS, GALILEO, VHF radio-navigation beacons, inertial units);

Flight plan (FPLN), in order to input the geographical elements constituting the skeleton of the route to be followed (departure and arrival procedures, waypoints, airways);

Navigation Database (NAVDB), in order to construct the geographical routes and procedures based on data included in the data bases (points, tags/markers, interception or altitude legacy data . . . );

Performance database containing the parameters pertaining to the aerodynamics and engines of the aircraft.

Lateral trajectory TRAJ: in order to construct a continuous trajectory on the basis of the points of the flight plan, adhering to the airplane performance factors and in compliance with the confinement constraints (Required Navigation Performance RNP);

PRED predictions: in order to construct an optimised vertical profile on the lateral trajectory;

Guidance GUID, in order to guide the aircraft in its 3D trajectory in the lateral and vertical planes, while optimising the speed;

Digital data link DATALINK, in order to communicate with the air traffic/ground control operational centres and other aircraft.

On the basis of a predefined flight plan (list of passage points referred to as "waypoints") and procedures (relating to the aspects of: departure, arrivals, air routes, missions), the FMS of the leader aircraft A1 is adapted for calculating the target 3D trajectory (geographical coordinates in 3 dimensions) of the aircraft A1, as a function the geometry between the waypoints, the performance factors of the aircraft and the constraints of the flight plan (altitude, speed, time, slope). This trajectory can be updated over time based on certain factors (meteorological, regulatory, air traffic, etc).

Based on the position sensors available on the aircraft A1 (GPS, IRS inertial units, Very High Frequency [VHF] Omni-Directional Range [VOR] radio beacon receiver, Distance Measuring Equipment [DME], etc) the FMS of the leader aircraft A1 is adapted for establishing at any time instant its 3D vector (3D position, 3D speed). Similarly, based on the position sensors available on the accompanying aircraft A2, the FMS of the aircraft A2 is also adapted for establishing at any time instant its 3D vector.

The aircraft A1 and A2 in the embodiment considered include wireless communication means. The aircraft A1 is in addition adapted for transmitting in real time its currently established 3D vector to the aircraft A2, via these wireless communication means. As for the aircraft A2 it is adapted for receiving, via these wireless communication means, the currently established 3D vector of the aircraft A1, and of processing the latter in real time. The aircraft A1 is in addition adapted for transmitting in real time its currently established target 4D trajectory to the aircraft A2. The aircraft A2 is in addition adapted for collecting, via these wireless communication means or by other means, the target 4D trajectory of the aircraft A1.

The FMS of the leader aircraft A1 is adapted for determining, based on the calculated 4D trajectory and its established 3D vector, the guidance indications which are communicated to the pilot, or to the automatic pilot, of the leader aircraft A1.

On the basis in particular of the target 4D trajectory calculated for the leader aircraft A1 and/or the 3D vector received from the leader aircraft A1, and on the basis of the currently established position of the accompanying aircraft A2, the automatic flight information determination device 1 for automatically determining flight control indications for the accompanying aircraft A2 is adapted for developing, relative to each of its lateral, vertical and longitudinal axes, the guidance indications that enable the automatic tracking and following of the leader aircraft A1 with the appropriate spacing. The automatic pilot of the aircraft A2 is adapted for operationally executing these indications.

Figure 2:
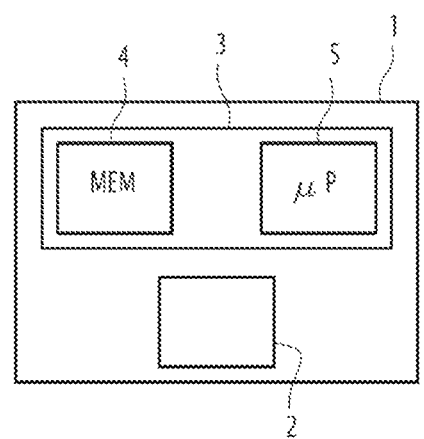
FIG. 2 is a view of a piloting indications determination device for determining piloting indications in one embodiment of the invention.

A view of an automatic flight control indications determination device 1 in one embodiment of the invention is shown in FIG. 2. The device 1 herein includes a data collection interface 2 and a data processing module 3.

The data collection interface 2 is adapted for collecting two types of data related to location of the leader A1:
the data indicating the updated target 4D trajectory of the leader aircraft A1; and
the data indicating the current 3D vector of the leader aircraft A1.
Typically, the 4D trajectory data (TRAJ) includes:
a lateral trajectory, ie in the 2D horizontal plane (2 dimensions) of the aircraft A1 (axes X1, Y1) including of the waypoints and the geographical coordinates thereof;
a vertical profile, ie the vertical plane in 1D (Z1);
a speed profile along 1D longitudinal axis;
a temporal profile identified by the expected time of passage over each of the points.

The current 3D vector data (VECT) include the attitude vector (position in the horizontal plane, altitude) and the 3D speed vector as actually measured in real time for the aircraft A1.

Sometimes it is not possible for the data of the current 3D vector VECT of the leader aircraft A1 to be collected by the accompanying aircraft A2, for example because of problems relating to radio transmission, jamming, and defective or faulty sensors on the leader aircraft A1.

Also it may so happen that not all the components of the trajectory TRAJ are known at each given time instant. The required minimum is the lateral trajectory, without which the trajectory is considered to be unavailable, but the 2 other components (vertical, velocity) may or may not be available.

Subsequently, as the parameters of each of the dimensions are analysed and used independently of each other in order to calculate the guidance parameters of the accompanying mobile craft, when the availability of the current position is lost and/or the availability of the 4D target trajectory is partial, the hybrid solutions will be processed.

The guidance information items (also referred to as piloting indications) are generally indications with respect to each of the 3 axes: in terms of roll, pitch (angle of pitch or load factor) and velocity, developed as a function of the deviations, over each of the 3 axes of the aircraft, between the current position (or current vector) of the leader and the current position (or current vector) of the accompanying aircraft, calculated for the aircraft towards the guidance whereof these indications are directed.

Each of these indications is thus developed in general based on a difference between a target value (for example Target Altitude Zc) and a current value (for example Current Altitude Z), and in one embodiment, on damping gains K1 and limiter gains, and sometimes additionally also based on a difference between the derivatives of these values (for example target vertical velocity Vzc and current vertical velocity Vz) and sometimes based on other gains and damping K2. In one embodiment of the invention, the target altitude is the target altitude of the aircraft to which is added a vertical/flight level separation value (+ or − depending on whether the accompanying aircraft is above or below the leader aircraft).

Thus, the vertical indication of commanded load factor Nzc has in one embodiment a form Nzc=K1 (Z−Zc)+K2 (Vz−Vzc). And Zc could follow a law of convergence to the vertical/flight level separation value which will also depend on the distance between the two aircraft.

Similarly, the lateral indication could be a commanded roll of the type fc=K1. XTK+K2. TKE (XTK=deviation of distance between the follower aircraft and followed aircraft plus a lateral/between tracks separation value, TKE=Track Angle error=difference between the track of the accompanying aircraft and the track of the leader aircraft).

Similar principles are operationally implemented relative to the longitudinal axis, and also for the speed aspect.

Figure 3:
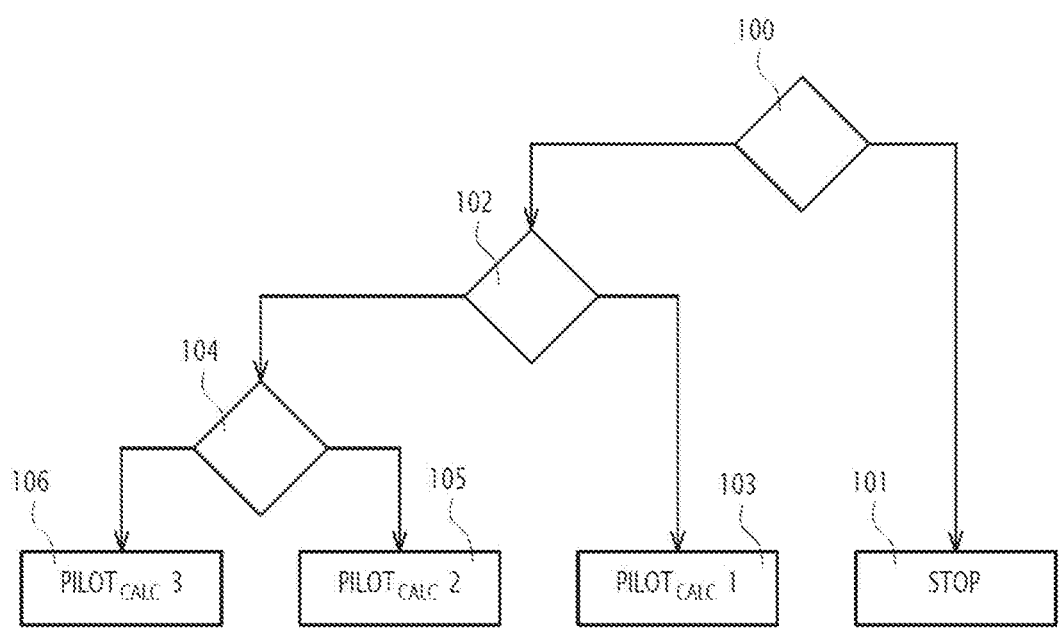
FIG. 3 is a flowchart of steps operationally implemented in one embodiment of the invention.

In the embodiment considered, the data processing module 3 is adapted for calculating the flight control/piloting indications for the accompanying aircraft A2 for each dimension from among the vertical dimension (associated with the vertical/flight level separation), the longitudinal dimension (associated with the longitudinal/along track separation), and the lateral dimension (associated with the lateral/between tracks separation) considered independently, a set of steps as described schematically in FIG. 3.

In the embodiment considered, the data processing module 3 includes a memory storage unit 4 and a microprocessor 5, and the memory storage unit 4 stores the software instructions which, when they are executed on the microprocessor 5, bring about the operational implementation, by the data processing module 3, of the steps shown in FIG. 3. The operational implementation of these steps is reiterated according to a time period T, with T comprised within the range 120 to 200 ms for vertical/flight level separation and lateral/between tracks separation, of the order of 1s for longitudinal/along track separation In another embodiment, the data processing module 3 is each created in the form of a programmable logic component, such as an FPGA (abbreviation for Field Programmable Gate Array), or even in the form of a dedicated integrated circuit, such as an ASIC (abbreviation for Applications Specific Integrated Circuit).

In accordance with the embodiments, one formation flight mode or multiple formation flight modes are considered, each mode being associated with a distinct set of minimum spacing including of a minimum vertical/flight level separation value, a minimum longitudinal/along track separation value, a minimum lateral/between tracks separation value.

With reference to FIG. 3, in a step 100, it is determined as to whether, among the data collected relating to the leader aircraft A1, the data indicating the current position of the leader aircraft A1 in relation to the dimension considered X1, Y1, or Z1, or the data pertaining to the target 4D trajectory, in relation to the same dimension considered of the leader aircraft A1 corresponding to a time of passage equal to the current time instant are available.

If not, in a step 101, the formation flight is abandoned.

If yes, it is then determined, in a step 102, whether, among the data collected relating to the leader aircraft A1, the data VECT indicating the current 3D vector of the leader aircraft A1 in relation to the dimension considered are available.

If not (ie if the data indicating the current 3D vector of the leader aircraft A1 in relation to the dimension considered are not available), in a step 103, the pilot indications for the accompanying aircraft A2 are determined, in relation to the dimension considered, on the basis of a calculation method, $PILOT_{CALC}1$, using as input, in addition to the currently established 3D vector of the aircraft A2, the said collected data pertaining to the target 4D trajectory corresponding to a time of passage equal to the current time instant and the predefined minimum spacing value corresponding to the dimension considered (which is either a minimum vertical/flight level separation value for the axis Z2, or a minimum longitudinal/along track separation value for the axis X2, or a minimum lateral/between tracks separation value for the axis Y2) for the previously selected formation flight mode. The calculation method $PILOT_{CALC}1$ is thus a method that uses the data pertaining to the target 4D trajectory only of the leader A1 and does not require the data indicating the current position of the aircraft A1 (notably the target position of the accompanying aircraft A2 on each of the axes considered (which is used to determine the deviations between its current position and its target position, and therefore to determine the piloting indications) is thus determined based on the data pertaining to the target 4D trajectory only of the leader A1 (and not the data VECT) utilised by $PILOT_{CALC}1$ and the pre-determined minimum values of vertical/flight level separation, longitudinal/along track separation and lateral/between tracks separation to be adhered to).

If yes (ie if the data VECT indicating the current 3D vector of the leader aircraft A1 in relation to the dimension considered are available), in a step 104, it is then determined whether, among the data collected relating to the leader aircraft A1, the trajectory data, in relation to the considered dimension, of the leader aircraft A1 corresponding to a time of passage equal to the current time instant, are available.

If not, in a step 105, the piloting indications of the accompanying aircraft A2 are determined, in relation to the dimension considered, on the basis of a calculation method, $PILOT_{CALC}2$, using as input, in addition to the currently established position of the aircraft A2, the said data collected of the current vector VECT of the leader A1 and the predefined minimum spacing value corresponding to the dimension considered for the previously selected formation flight mode. The method of calculation $PILOT_{CALC}2$ is thus a method that makes use of the data VECT only and does not necessitate having knowledge of the target trajectory of the leader A1 (in particular the target position of the accompanying aircraft A2 on each of the axes considered (which serves to determine the deviations between its current position and its target position, and thus to determine the piloting indications) is thus determined based on the data VECT only of the leader A1 (and not on the target trajectory data) utilised by $PILOT_{CALC}2$ and the pre-determined minimum values of vertical/flight level separation, longitudinal/along track separation and lateral/between tracks separation) to be adhered to.

If yes, in a step 106, the pilot indications of the accompanying aircraft A2 are determined, in relation to the dimension considered, on the basis of a calculation method, $PILOT_{CALC}3$, using as input, in addition to the currently established vector of the aircraft A2, the said collected data of the current 3D vector (VECT) of the leader A1, the collected data pertaining to the target 4D trajectory corresponding to a time of passage equal to the current time instant and the predefined minimum spacing value corresponding to the dimension considered for the previously selected formation flight mode (in particular the target position of the accompanying aircraft A2 on each of the axes considered (which serves to determine the deviations between its current position and its target position, and therefore to determine the piloting indications) is thus determined on the basis of the data VECT of the leader A1 and the trajectory data utilised by $PILOT_{CALC}3$ and the predefined minimum values of vertical/flight level separation, longitudinal/along track separation, and lateral/between tracks separation to be adhered to).

Examples of the calculation methods $PILOT_{CALC}1$, $PILOT_{CALC}2$, $PILOT_{CALC}3$ according to the different dimensions are described here below.

Once all of the piloting indications for the aircraft A2 have been determined for all three dimensions, these indications are delivered by the data processing module 3 to the automatic pilot of the accompanying aircraft A2 for the operational implementation thereof.

The steps according to the invention described here above relating to the determination of the guidance information items indeed obviously also serve to determine the deviations along the three axes between the current position of the leader aircraft and the current position of the accompanying aircraft based on which the guidance indications are developed in one embodiment, it being possible in accordance with the embodiments for these deviations to be displayed on a human-machine interface in another aircraft.

In one embodiment, the data processing module 3 of the accompanying aircraft A2 is in addition adapted for controlling the behaviour of the leader aircraft A1, as described here below.

Nominally, the collected current position of the leader A1 should follow the reference trajectory defined for the latter.

The data processing module 3 of the accompanying aircraft A2 is capable, based on a deviation greater than a given threshold value over a predetermined period of time between the reference trajectory and the current position, of identifying a situation of non-validity of the data and information collected, such as the failure by the leader mobile craft to follow the reference trajectory or the non-receipt of the current position data, and upon such identification being made to promptly switch, if it were using a calculation method $PILOT_{CALC}3$, from the calculation method $PILOT_{CALC}3$ (trajectory related data and position related data) to a calculation method that uses the data which remains valid $PILOT_{CALC}2$ (position related data only) or $PILOT_{CALC}1$ (trajectory related data only), which will have an impact on the deviations between the leader A1 and the accompanying mobile aircraft A2, by increasing them. The data processing module 3 will also manage the return to validity of the information collected and the selection of the associated calculation mode.

It should be noted that the function of detecting any deviation that is greater than a given threshold is, in one embodiment, a prerequisite for the determining of a guidance indication, but could also be used in parallel for any warning-alarm mechanism (even if there is no guidance), it being possible to use and forward this warning-alarm as necessary:

1) to the accompanying mobile aircraft, in case there is a pilot on board;

2) to the ground for a controller (or pilot of a drone);

3) to a third-party aircraft that is not participating in formation but is part of the mission tracking system (eg Airborne Warning And Control System AWACS);

4) to trigger a specific guidance mode on the accompanying aircraft.

In one embodiment, a plurality of formation flight modes are defined.

The formation flight mode is defined, for example, by the "in-formation navigation performance" calculated on the basis of:

the data provided by the leader aircraft A1 (of position and/or target 4D trajectory);

the control of the behaviour of the leader aircraft A1 when it is no longer following the target trajectory during the course of using the calculation method $PILOT_{CALC}3$ described here above, with the control thus then switching on the corresponding axis to the calculation mode $PILOT_{CALC}2$;

the precision performance of the leader aircraft A1, in other words the precision of the guidance of the leader A1 in proportion to the type of parameters provided by the sensors of the leader mobile craft (IRS, GPS, etc): when the precision error of the geolocation sensors for example of A1 is greater than the limit values of E1, E2 or E3;

the precision performance, in other words the precision of the guidance, of the accompanying aircraft A2 in proportion to the type of parameters provided by the sensors of the accompanying aircraft A2 (IRS, GPS, etc): when the precision error of the geolocation sensors for example of A2 is greater than the limit values of E1, E2 or E3;

the reference coordinates system of the two aircraft A1, A2 (specific individual reference coordinates systems, or common reference coordinates system).

In the embodiment under consideration, 4 formation flying modes are considered. Quite obviously any other number may be considered instead.

For each of these 4 modes, the limit values for vertical/flight level separation, longitudinal/along track separation, lateral/between tracks separation are defined according to Table 1 here below. In the present case, the minimum and maximum values have been established in metres (m) or kilometres per hour (km/h); in other embodiments, only minimum values are defined.

TABLE 1

| Formation Flight Mode | Vertical/flight level separation E1 (m) | Longitudinal/ along track separation E2 (km/h) | Lateral/between tracks separation E3 (m) |
|---|---|---|---|
| 1. "Tight" | 5 < E1 < 100 | 1 ≤ E2 < 10 | 5 < E3 < 100 |
| 2. "Near" | 100 ≤ E1 < 500 | 10 ≤ E2 < 50 | 100 ≤ E3 < 1000 |
| 3. "Loose" | 500 ≤ E1 < 1000 | 50 ≤ E2 < 100 | 1000 ≤ E3 < 5000 |
| 4. "Far" | E1 ≥ 1000 | E2 ≥ 100 | E3 ≥ 5000 |

Windows of values associated, for each axis, with the formation flight mode

The formation flight mode initially selected is a function of the mission envisaged. The mission also defines the strategy in the event of loss of navigation performance during formation: either to call off (abort) the mission or to continue it in a degraded mode, that is to say, with greater spacing.

Thus, in the event of one or more situations occurring such as:
- the accompanying aircraft A2 detects that the leader is not following the target trajectory;
- the accompanying aircraft A2 possibly is not able to maintain the minimum value initially defined for E1, E2, or E3;
- the leader aircraft A1 does not provide the location related data required for the mode selected;
- the precision performance of the leader aircraft A1 has either deteriorated or improved;
- the precision performance of the accompanying aircraft A2 has either deteriorated or improved;

several actions are possible:
- one action consists in degrading the level of the formation flight mode, in other words increasing the separation distance between the leader aircraft A1 and its accompanying aircraft A2 if the mission should so permit;
- another action consists in increasing the formation flight mode level, in other words reducing the separation distance between the leader aircraft and its accompanying aircraft if the mission should so permit;
- yet another action consists in abandoning the formation flight.

Figure 4:
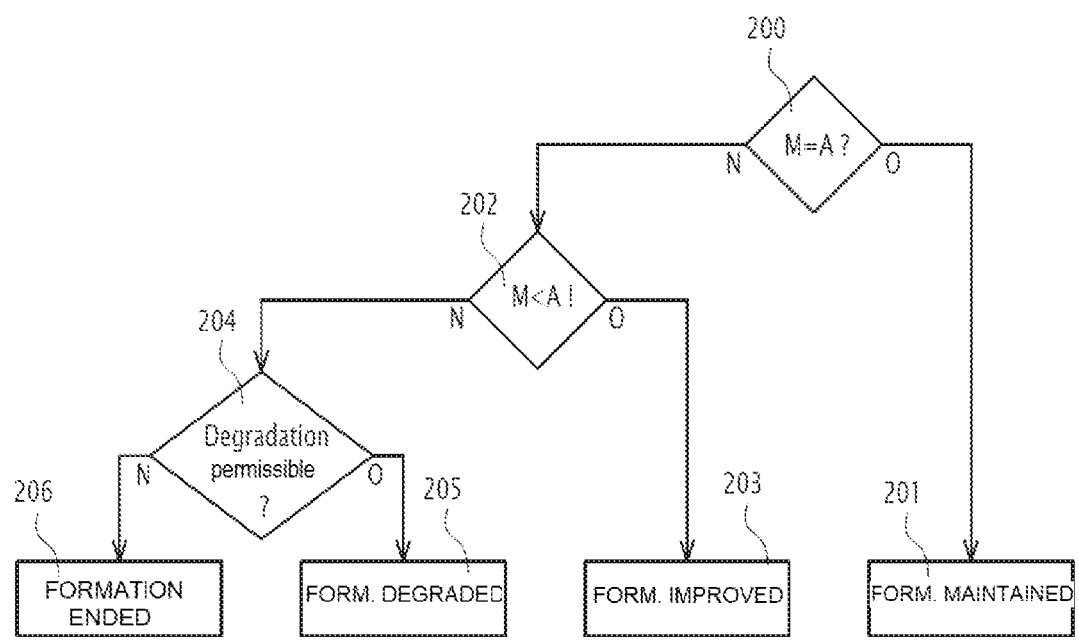
FIG. 4 is a flowchart of steps operationally implemented in one embodiment of the invention.

FIG. 4 illustrates a mode update method for updating the formation flight mode that is operationally implemented by the data processing module 3 of the accompanying aircraft A2 in one embodiment of the invention, in relation to a spacing parameter Ei, i=1, 2, or 3. The method is implemented respectively for each of these parameters E1, E2, E2.

This method is executed by the data processing module 3 in a regular manner according to a predefined time period t, with t for example included within the interval [1s, 5s]. A change (loss of information (the aircraft vector data are no longer being received), addition of information items (the Target 4D trajectory becoming available again) could also trigger the execution of the process on a parameter Ei or on all the parameters E1, E2, E3.

Here mode 1 represents the best level of formation flight mode, which cannot be further improved and mode 4 is the lowest formation flight mode level, which cannot be further degraded. The greater the decrease in the mode level number, the lower (worse) the level of the flight.

In a step 200, the formation flight mode that is currently implemented being the mode A (A being equal to 1, 2, 3, or 4: see table 1):

in one embodiment, in-formation navigation performance is evaluated, by determining:
+ the guidance precision errors of the aircraft A1 and A2 relating to the dimension considered (corresponding to Ei);
+ the type(s) of target TRAJ data and/or current VECT data that are collected by the aircraft A2;
+ in addition, the reference coordinates system mode used: specific individual, or common (the tight formation flight mode may be envisaged only in common reference coordinates system mode for example);

subsequently, it is necessary to determine the maximum formation flight mode level to which the performance thus evaluated corresponds, based on the following criteria:
+ the guidance precision errors of the aircraft A1 and A2 relating to the dimension considered (corresponding to Ei) must remain lower than the minimum spacing value Ei of the said formation flight mode; the lower the precision error, the higher the formation flight mode level may be;
+ the modes to which correspond the data TRAJ and/or VECT collected by the aircraft A2 (certain modes require that the data TRAJ or even VECT be available: for example in mode 1, the data VECT must be present; in mode 2, target TRAJ and VECT must be available; in mode 3 only VECT may be available; in mode 4 only target TRAJ may be available.

This maximum formation flight mode level as a function of the in-formation navigation performance is referred to as "level M" here below (M taking the value 1, 2, 3 or 4).

Then, in a step 200, it is determined as to whether the mode M is equal to the mode A.

If yes, the formation flight mode level being implemented is maintained, in a step 201, for the dimension considered.

If the mode M is not equal to the mode A, in a step 202, it is determined as to whether the mode M is a better mode than the current mode A (to put it another way: if M<A), which would signify that an improvement in mode level is possible.

If yes, in a step 203, a switch in mode level is commanded by the data processing module 3, from level A to level M (for example, level A is equal to 2, level M is equal to 1, and a switch from level 2 to level 1 is commanded).

If the mode M is not a better mode than the current mode A (to put it another way: if M>A), then in a step 204, it is determined as to whether a degradation of formation flight mode level to the level M is permissible by the type of mission being executed by the formation flight, at that time instant.

If yes, in a step 205, a switch in mode level is commanded by the data processing module 3, from the level A to the level M (for example, the level M is equal to 2, the level A is equal to 1 and a switch from level 1 to level 2 is commanded).

If not, in a step 206, the formation flight is terminated.

The switch over to another mode as described here above is applicable only for the dimension considered E1, E2, E3, for the implementation of the algorithm (in other words, only the minimum value for E1, E2, E3 changes).

In another embodiment, if the mode M determined for E1, E2, E3 is referred to as respectively M1, M2, and M3, the data processing module 3 switches the formation flight mode level to the least good among M1, M2, M3 for all of the dimensions.

As previously described, each of the vertical separation (between flight levels), longitudinal/along track separation, lateral/between tracks separation parameters corresponds to its specific individual VECT and TRAJ data which will not all be available at the same time instant. There will be hybrid solutions with for example the lateral TRAJ available on the lateral/between tracks separation and only the VECT on the vertical/flight level separation.

In similar manner on each of the planes (lateral, vertical, longitudinal of the airplane ie X2, Y2, Z2), a performance level for navigation level is calculated.

Examples of calculation methods $PILOT_{CALC}1$, $PILOT_{CALC}2$, $PILOT_{CALC}3$ are set out here below, first of all considering that the leader aircraft A1 and the accompanying aircraft A2 each have their specific individual reference coordinates system.

In the specific individual reference coordinates system mode, the data VECT or TRAJ collected by the accompanying aircraft A2 from the leader A1 are re-transcribed in the specific individual reference coordinates system of the accompanying aircraft A2 (X2, Y2, Z2) and the guidance indications are calculated in the reference coordinates system of the accompanying aircraft.

For the Vertical Dimension (Vertical/Flight Level Separation E1):

The method $PILOT_{CALC}1$, which uses the data TRAJ only (and not the data VECT), therefore uses the vertical profile data of the target 4D trajectory for the dimension considered: $PILOT_{CALC}1$ constructs a vertical profile for the accompanying aircraft A2 by offsetting, on the vertical axis Z2 relative to the vertical profile of the leader A1, by the minimum vertical/flight level separation value established between the trajectory of the leader A1 and the trajectory of its accompanying aircraft A2. In other words, the method $PILOT_{CALC}1$ effects a vertical offset of the vertical profile, the altitude of the accompanying aircraft A2 is fixed by the following of the thus offset vertical profile.

Figure 5:
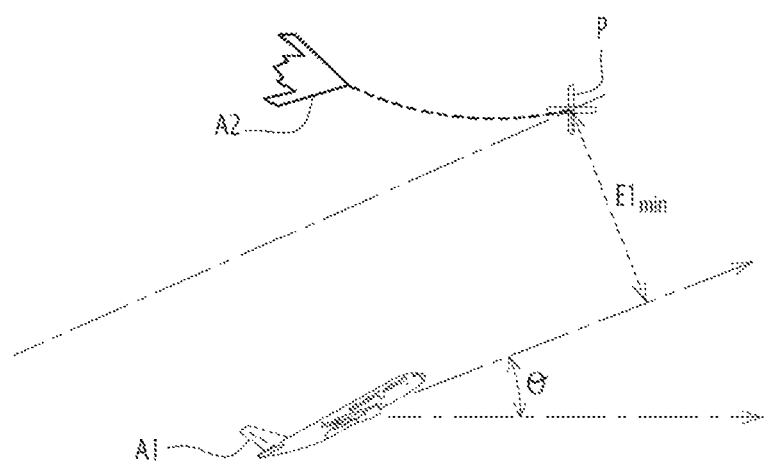
FIG. 5 illustrates the computation of vertical guidance indications.

$PILOT_{CALC}2$, which uses the data VECT only and not the data TRAJ, therefore uses the measured altitude for the aircraft A1, for the dimension considered. In this case having only the airplane attitude, with reference to FIG. 5, where the point P designates the objective position of A2 (ie where it is expected to be found in order to commence the accompanying), a vertical segment is constructed with a constant slope θ equal to that of the speed of the aircraft A1 as indicated by the data VECT and the vertical profile of the accompanying mobile aircraft A2 is constructed by offsetting by the minimum vertical/flight level separation value $E1_{min}$ between the leader mobile aircraft and its accompanying mobile aircraft. With for example, the following rules:

If $θ > θ_{threshold}$ then segment type SLOPE

Profile accompanying
aircraft($θ_{accompanying\ aircraft}$)=Profile leader aircraft($θ_{leader\ aircraft}$)+OFFSET$_{Vertical}$ $Si θ ≤ θ_{threshold}$
then segment type LEVEL Profile accompanying
aircraft($θ_{accompanying\ aircraft}$)=0+OFFSET$_{Vertical}$ A possible value for $θ_{threshold}$=0.15°.

$PILOT_{CALC}3$ uses the data VECT and the data TRAJ and develops the guidance indications for the accompanying aircraft A2 by using the same guidance modes as the leader aircraft A1: change in level in climb, holding level-off altitude, and slope/air speed in descent.

Knowing the vertical profile (TRAJ) and the airplane vector (VECT) makes it possible to better anticipate or detect slope changes of the leader aircraft A1: the vertical profile has not changed and the aircraft A1 moves away from it, the vertical profile has changed and the aircraft A1 will move closer thereto. These 2 modifications are better managed by the fact that the 2 information items TRAJ AND VECT are known.

For the Longitudinal Dimension (Longitudinal/Along Track Separation E2):

The method $PILOT_{CALC}1$, which uses the data TRAJ (and not the data VECT), therefore uses the trajectory data for the dimension considered and computes a longitudinal speed profile
based on the speed profile including the speed indications based on a prediction of speed derived from the trajectory
from the adjustment of speed in order to maintain the (lateral) between tracks separation in case of turning
with $SPEED_{accompanying\ aircraft} = SPEED_{trajectory} * Rd/Ra$ where $SPEED_{accompanying\ aircraft}$ is the speed indication of the accompanying aircraft A2 in relation to the longitudinal dimension corresponding to the longitudinal/along track separation, $SPEED_{trajectory}$ is the longitudinal speed of the leader aircraft A1, Rd is the radius of turn of the accompanying aircraft A2 and Ra is the radius of turn of the leader A1 (see the calculations presented in relation to the lateral dimension for obtaining radius values).

Indeed, during a turn the accompanying mobile aircraft A2 will be found either outside the turn, or inside the turn, it will thus have a shorter or longer path and in order to maintain a constant lateral/between tracks separation, an adjustment of the speed is used.

$PILOT_{CALC}2$ uses, for the dimension considered, only the data VECT and not the data TRAJ. In this case, at present having available the position and speed of the leader mobile aircraft A1, a servocontrol is effected using the command formula of the ASAS computer:

$$SPEED_{accompanying\ aircraft} = GROUND\ SPEED_{leader\ aircraft} - \frac{d_{error}}{\tau au}$$

where $SPEED_{accompanying\ aircraft}$ is the speed control command of the accompanying aircraft A2,
$GROUND\ SPEED_{leader\ aircraft}$ is the ground speed of the leader aircraft A1,
τau is the dynamics of the control law and is a time value included in the range [60, 180], and is for example equal to 120 ms,
$d_{error}$ is the signalled deviation (corresponding to a safety margin that compensates the inertia so as to reach the target speed) between the position of the leader mobile aircraft and the position of the accompanying mobile aircraft and$_{obj}$ is the minimum longitudinal/along track separation value. In this mode, the speed changes are brought about with no anticipation or adjustment in the event of a turn.

$PILOT_{CALC}3$ uses, for the dimension considered, the data VECT and the data TRAJ and develops the guidance indications of the accompanying aircraft A2 as in $PILOT_{CALC}1$, in addition, with the better detection of a change (immediately upon detection of a speed which no longer corresponds to the speed profile, or of a new speed profile) by using the speed profile and the speed vector this makes it possible to detect that the speed profile is not valid and to switch again for example in $PILOT_{CALC}2$).

For the Lateral Dimension (Lateral/between Tracks Separation E3):

The method $PILOT_{CALC}1$, that uses, for the dimension considered, the data TRAJ (and not the data VECT), therefore uses the data of the trajectory for the dimension considered: the input parameters of the lateral guidance law are calculated by biasing its input in such manner as to cause the accompanying mobile aircraft to fly with lateral offset. For rectilinear segments, $PILOT_{CALC}1$ effects a lateral offset of the trajectory by the established minimum lateral/between tracks separation value between the trajectory of the leader A1 and the trajectory of its accompanying aircraft A2.

For turning segments, it will be necessary to update the nominal roll (Roll) with the new radius of turn:

$$ROLL_{Nominal_{accompanying\ aircraft}} = \arctan\left(\frac{GROUND\ SPEED^2_{accompanying\ aircraft}}{g*R_d}\right)$$

with $GROUND\ SPEED_{accompanying\ aircraft}$: the ground speed of the accompanying aircraft A2, with $R_a = \frac{GROUND\ SPEED^2_{leader}}{g*\tan(ROLL_{leader})}$ with $R_d = R_a + sign(Roll_{Leader}) * OFFSET_{Lateral}$ $R_a$=Radius of turn described by the leader mobile aircraft A1
$R_d$=Radius of turn described by the accompanying mobile aircraft A2.

The accompanying mobile aircraft A2 has a roll limit. This limit is applied by the standard lateral guidance law. In order to ensure the continued ability of the accompanying mobile aircraft A2 to fly the trajectory offset by the minimum lateral/between tracks separation value $OFSET_{lateral}$, the radius of turn should adhere to the domain of turn radii defined by the following equation:

$$R_d \in \left[\frac{SPEED_{accompanying\ aircraft\ MIN}}{\psi dot}, \min\left(\frac{g*\tan\phi_{MAX}}{\psi dot}, \frac{SPEED_{accompanying\ aircraft\ MAX}}{\psi dot}\right)\right]$$

with ψpdot being the vertical rotation speed and $\Phi_{MAX}$ the maximum roll

In other words, the radius of turn of the accompanying mobile aircraft A2 must be included within an interval depending on its speed limits and its maximum roll.

$PILOT_{CALC}2$, uses only the data VECT for the dimension and not the data TRAJ. In this case, a provisional trajectory of the accompanying mobile aircraft A2 is defined based on the attitude of the leader mobile aircraft A2. This entails adapting the inputs of the standard lateral guidance law based on the inclination of the wings of the leader mobile aircraft in order to define the turn radius of the accompanying mobile aircraft.

With $R_a$ and $R_d$ being respectively the radii of turn of the leader mobile aircraft A1 and the accompanying mobile aircraft A2.

$OFF_{lat}$, $OFF_{long}$, are respectively, the minimum value of lateral offset (established minimum lateral/between tracks separation), and minimum value of longitudinal offset (established minimum longitudinal/along track separation), that define the target position in the coordinate system of the mobile craft.

Taking as reference the ground speed of the leader mobile craft and its roll, the following is obtained in turn as previously seen $$R_a = \frac{GROUND\ SPEED^2_{leader}}{g*\tan(ROLL_{leader})}$$

from which is deduced $$R_d = \sqrt{(R_a + OFF_{lat})^2 + OFF^2_{long}}$$

$$ROLL_{Nominal_{accompanying\ aircraft}} = \arctan\left(\frac{GROUND\ SPEED^2_{accompanying\ aircraft}}{g*R_d}\right).$$

$PILOT_{CALC}3$ uses, for the dimension considered, the data VECT and the data TRAJ relating to the lateral dimension.

As for the other axes, the availability of the short-term trajectory (current segment and subsequent segment) and that of the current position of the leader mobile aircraft A2 make it possible to anticipate changes in nominal rolls in following the trajectory.

Examples of calculation methods $PILOT_{CALC}2$ are set out here below, now considering that the leader aircraft A1 and accompanying aircraft A2 have the same reference coordinates system. In the common reference coordinates system mode, only the method $PILOT_{CALC}2$ is used.

In one embodiment, within the concept of a common reference coordinates system, the accompanying mobile aircraft A2 will this time, not have a position relative to its reference coordinates system, but rather in the coordinate system of the leader mobile aircraft itself. In other words, the leader mobile aircraft A2 and the accompanying mobile aircraft A2 form a single block during the entirety of the formation phase, it is no longer a matter of relative position line.

In this case, the solution consists in computing the flight control commands of the accompanying mobile aircraft A2 on the basis of the targets of the formation flight mode translated through the pre-determined minimum spacings: vertical/flight level separation, longitudinal/along track separation, and lateral/between tracks separation.

Thus, on the basis of the target values for vertical/flight level separation, longitudinal/along track separation, and lateral/between tracks separation, the parameters for offsetting ("offset") on each of the axes of the navigation coordinate system $offset_{Longitudinal}$, $offset_{Lateral}$, and $offset_{Vertical}$ are calculated.

Figure 6:
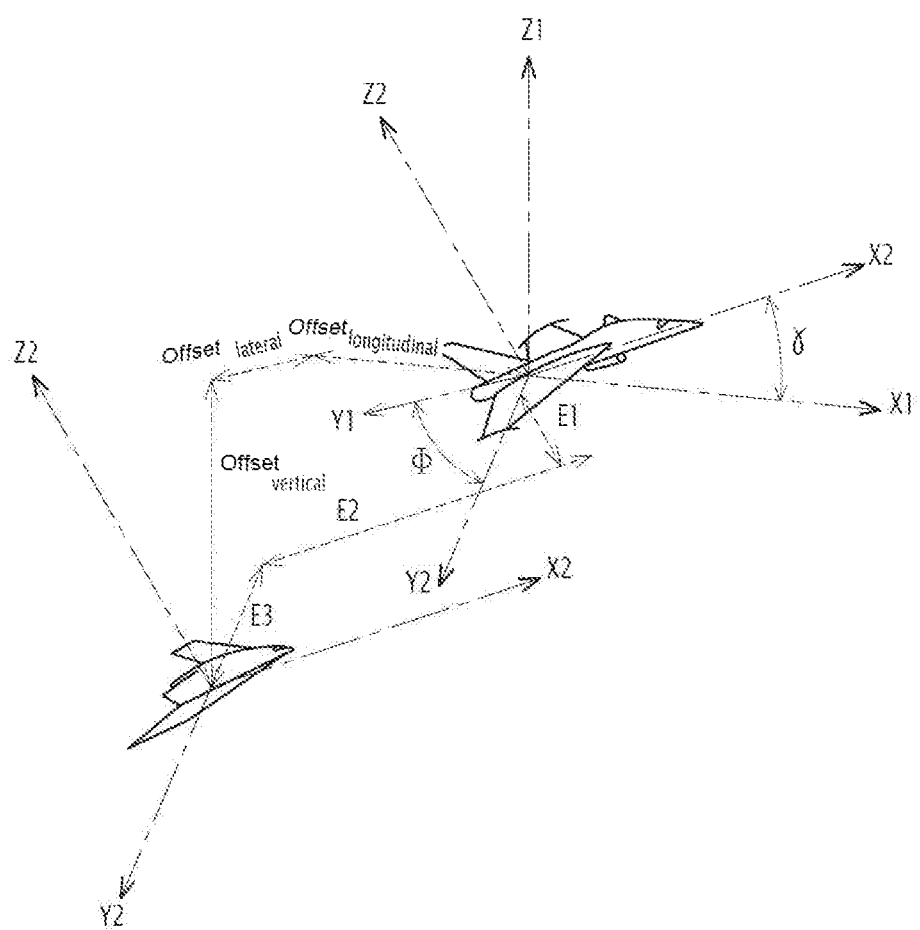
FIG. 6 illustrates the calculation of guidance indications on all the axes (common reference coordinates system).

The rotation formula used in this calculation is as follows:

$$\begin{pmatrix} offset\ Longitudinal \\ offset\ Lateral \\ offset\ Vertical \end{pmatrix} = \begin{pmatrix} \cos\gamma & 0 & -\sin\gamma \\ 0 & 1 & 0 \\ \sin\gamma & 0 & \cos\gamma \end{pmatrix} * \begin{pmatrix} 1 & 0 & 0 \\ 0 & \cos\emptyset & -\sin\emptyset \\ 0 & \sin\emptyset & \cos\emptyset \end{pmatrix} * \begin{pmatrix} longitudinal\ separation \\ lateral\ separation \\ vertical\ separation \end{pmatrix}$$

with γ and Ø respectively being the slope and the roll of the airplane A1.

γØ The parameters offset$_{Longitudinal}$, offset$_{Lateral}$ and offset$_{Vertical}$ thus obtained on each of the axes X2, Y2, Z2 and also represented in FIG. 6 constitute the inputs of the standard flight control/piloting laws for defining the indications for guidance in roll, acceleration and load factor. In this FIG. 6 which deals with the particular case of the common reference coordinate system for the two mobile aircraft, X1, Y1, Z1 represents the initial reference coordinate system and X2, Y2, Z2 the target reference coordinate system after modification of the attitude of the leader A1.

The accompanying of a leader is a problem that is common to different domains. In the case described more specifically here above, the solution is applied to a military leader aircraft accompanied by another aircraft for example (but not exclusively) without a pilot or unmanned. It could also be an unmanned mobile aircraft accompanied by another unmanned mobile aircraft.

In addition, the invention is applicable to the terrestrial, maritime surface or maritime underwater domains, as long as a leader mobile craft is defined and it provides the appropriate parameters to an accompanying mobile craft equipped with a servo-control system on a trajectory. In the embodiment described here above, the guidance indications determination device 1 determines the indications as a function of minimum values of vertical/flight level separation, longitudinal/along track separation, and lateral/between tracks separation to be adhered to. It will be noted that, more generally, according to the invention, it is adapted for determining these indications as a function of a set of at least two minimum separation values to be adhered to among a minimum vertical/flight level separation value, a minimum longitudinal/along track separation value, and a minimum lateral/between tracks separation value.

In one embodiment, the minimum value of vertical/flight level separation, longitudinal/along track separation and/or lateral/between tracks separation is replaced by a value representative of this minimum value, for example by the derivative thereof (ie relative speed on the corresponding axis: vertical, longitudinal and/or lateral respectively).

In another embodiment, the guidance indications determination device 1 is semi-automatic or assisted.

In one embodiment, the development of the piloting indications according to the invention is in no way limited to one accompanying mobile craft, but is operationally implemented in the context of a formation flight by N mobile accompanying vehicles with respective minimum deviations, depending on their positions relative to the leader mobile vehicle. In one embodiment, the N mobile accompanying vehicles are in fact accompanying craft-leader craft pairs, the leader i+1 being the accompanying craft of the accompanying craft i and so on, thus creating a chain.

The invention claimed is:

1. An accompanying mobile machine accompanying a leader mobile machine that includes an electronic flight information determination device for determining piloting information comprising piloting indications for piloting the accompanying mobile machine following the leader mobile machine and deviations in position between a current position of said leader mobile machine and a current position of said accompanying mobile machine, wherein said device is adapted for collecting location data of the leader mobile machine from among actual location data derived from measurements relating to a current location of the leader mobile machine and target trajectory data of the leader mobile machine, and for determining, on the basis of said location data collected, piloting information for piloting the accompanying mobile machine as a function of a set of at least two values to be adhered to with respect to the location defined by the data collected, said values to be adhered to being representative of at least two values among a minimum vertical/flight level separation value, a minimum longitudinal/along track separation value and a minimum lateral/between tracks separation value, the accompanying mobile machine in addition comprising either:
an automatic, semi-automatic or assisted piloting module, which is adapted for automatically piloting the said machine based on said indications, or
a human-machine interface adapted to display the deviations in position between the current position of said leader mobile machine and between the current position of said accompanying mobile machine,
wherein the electronic flight information determination device for determining piloting information, when determining piloting information, is adapted for selecting a calculation method among different calculation methods,
the electronic flight information device being adapted for selecting a first calculation method if the target trajectory data of the leader mobile machine is present among the most recently collected data and if the actual location data is absent among the most recently collected data, or selecting at least one other calculation method if the target trajectory data of the leader mobile machine is absent among the most recently collected data and if the actual location data is present among the most recently collected data.

2. The accompanying mobile machine according to claim 1, that is adapted for determining, in relation to each of at least two dimensions among the longitudinal, vertical and lateral dimensions associated with said at least two values to be adhered to, the piloting information, by selecting for each dimension independently, from among different calculation methods, the calculation method for calculating the piloting information in relation to said dimension, based on the presence or absence, for said dimension, of said actual location data derived from measurements relating to the current location of the leader mobile machine or said data relating to the target trajectory of the leader mobile machine.

3. The accompanying mobile machine according to claim 1, adapted for selecting a formation flight mode from among a plurality of formation flight modes each associated with a different set of values to be adhered to, said device being adapted for modifying, based on said actual location data or target trajectory, said formation flight mode, on the basis of:
in the most recent data collected, the presence or absence of data extracted from a target trajectory and the presence or absence of actual location data derived from measurements relating to the current location of the leader mobile machine; or
the comparison between an accuracy of the actual location data derived from measurements relating to the current location of the leader mobile machine and the minimum separation values from the set of all minimum separation values.

4. The accompanying mobile machine according to claim 1, adapted for comparing, among the data collected, the actual location data derived from measurements relating to the current location of the leader mobile machine and the data relating to the target trajectory of the leader mobile machine, detecting a situation of the trajectory not being followed in case of deviation greater than a pre-determined threshold.

5. The accompanying mobile machine according to claim 1, wherein said values to be adhered to are values from among a time derivative of a minimum vertical/flight level separation value, a time derivative of a minimum longitudinal/along track separation value, and a time derivative of a minimum lateral/between tracks separation value.

6. A flight information determination method for determining flight control information for an accompanying mobile machine of a leader mobile machine from among piloting indications and deviations in position between a current position of said leader mobile machine and a current position of said accompanying mobile machine,
said method comprising the steps operationally executed by an electronic information processing module, the steps comprising:
collecting location data of the leader mobile machine, from among an actual location data derived from measurements relating to a current location of the leader mobile machine and target trajectory data of the leader mobile machine; and
determining, based on said location data collected, the piloting information items for the accompanying mobile machine as a function of a set of at least two values to be adhered to with respect to the location defined by the data collected, said values to be adhered to being representative of at least two of: a minimum vertical/flight level separation value, a minimum longitudinal/along track separation value, and a minimum lateral/between tracks separation value, and at least among:
automatically piloting said machine based on said indications, or
displaying said deviations on a human-machine interface,
wherein, the flight information determination method comprises a selection step, during the determination of the piloting information, for selecting a calculation method from among different calculation methods, said selection comprising:
selecting a first calculation method if the target trajectory data of the leader mobile machine is present among the most recently collected data and if the actual location data is absent among the most recently collected data, or
selecting at least one other calculation method if the target trajectory data of the leader mobile machine is absent among the most recently collected data and if the actual location data is present among the most recently collected data.

7. A non-transitory computer-readable medium including a computer program comprising of software instructions which, when executed by a computer, operationally implement a method according to claim 6.

* * * * *